United States Patent [19]

Amirsakis et al.

[11] Patent Number: 4,568,611
[45] Date of Patent: Feb. 4, 1986

[54] POLYESTER-POLYURETHANE COMPOSITION AND USE THEREOF

[75] Inventors: Charles J. Amirsakis, Lake Geneva, Wis.; Richard L. Bradshaw, Tucson, Ariz.

[73] Assignees: Morton Thiokol, Inc., Chicago, Ill.; International Business Machines Corporation, Armonk, N.Y.

[21] Appl. No.: 719,402

[22] Filed: Apr. 3, 1985

[51] Int. Cl.[4] .......................... G11B 5/70; B32B 27/40
[52] U.S. Cl. .............................. 428/425.9; 252/62.54; 360/134; 360/135; 360/136; 427/128; 428/328; 428/329; 428/694; 428/900
[58] Field of Search .................... 428/425.9, 329, 328, 428/694, 900; 427/128; 252/62.54; 360/134–136

[56] References Cited

U.S. PATENT DOCUMENTS

| | | | |
|---|---|---|---|
| 3,929,659 | 12/1975 | Graham | 252/62.54 |
| 4,284,750 | 8/1981 | Amirsakis | 528/79 |
| 4,286,022 | 8/1981 | Vermillion | 428/425.9 |
| 4,303,738 | 12/1981 | Gini | 428/423.1 |
| 4,420,601 | 12/1983 | Kuroda | 427/128 |
| 4,477,531 | 10/1984 | Kohler | 428/694 |
| 4,525,424 | 6/1985 | Bradshaw | 428/425.9 |

Primary Examiner—Ellis P. Robinson
Attorney, Agent, or Firm—Pollock, Vande Sande & Priddy

[57] ABSTRACT

A composition containing $CrO_2$ and a polyester-polyurethane wherein the chain extender contains a mixture of 1,4-butanediol and 1,6-hexanediol; and use thereof, especially in magnetic recording media.

27 Claims, 3 Drawing Figures

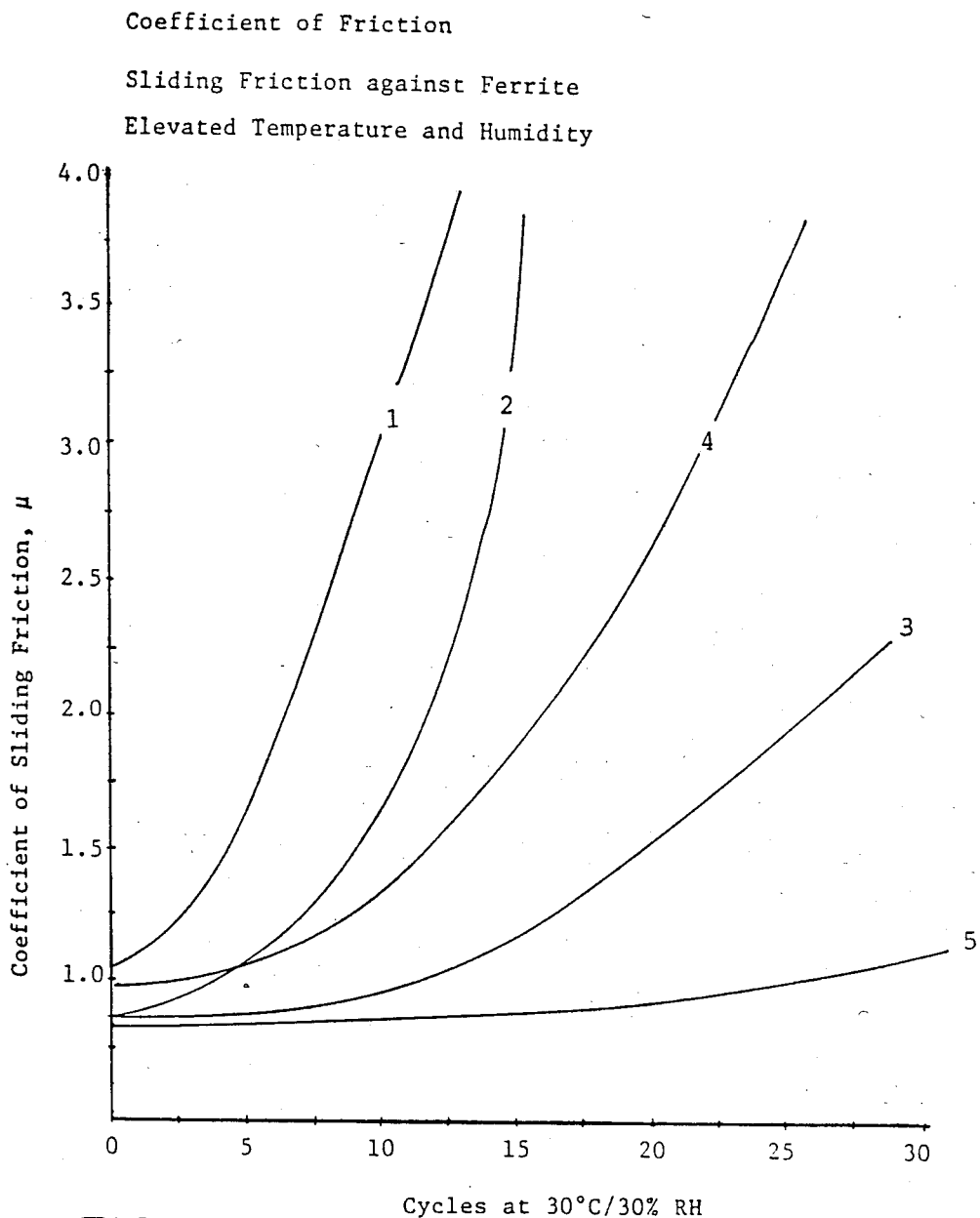
FIG. 1 Friction Measurements

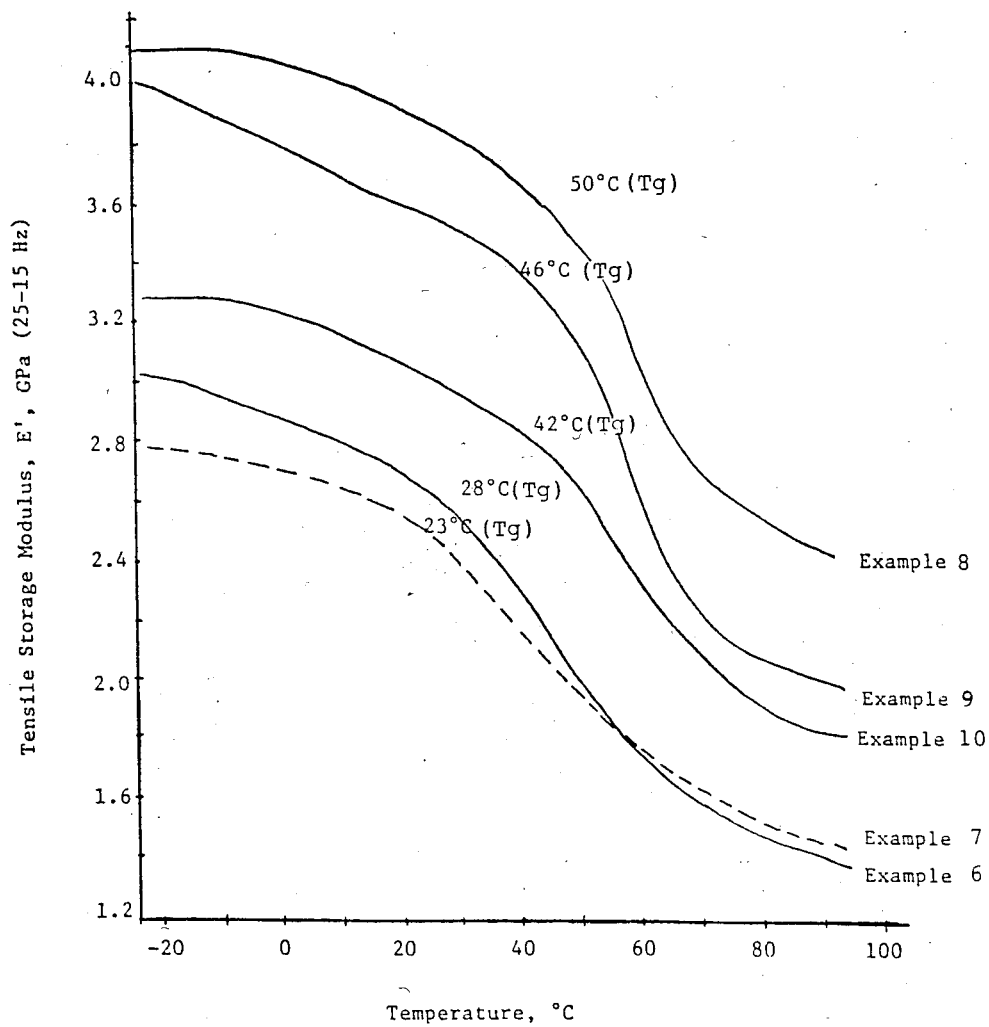
FIG. 2 Dynamic Mechanical Analysis of Magnetic Coating Free Films

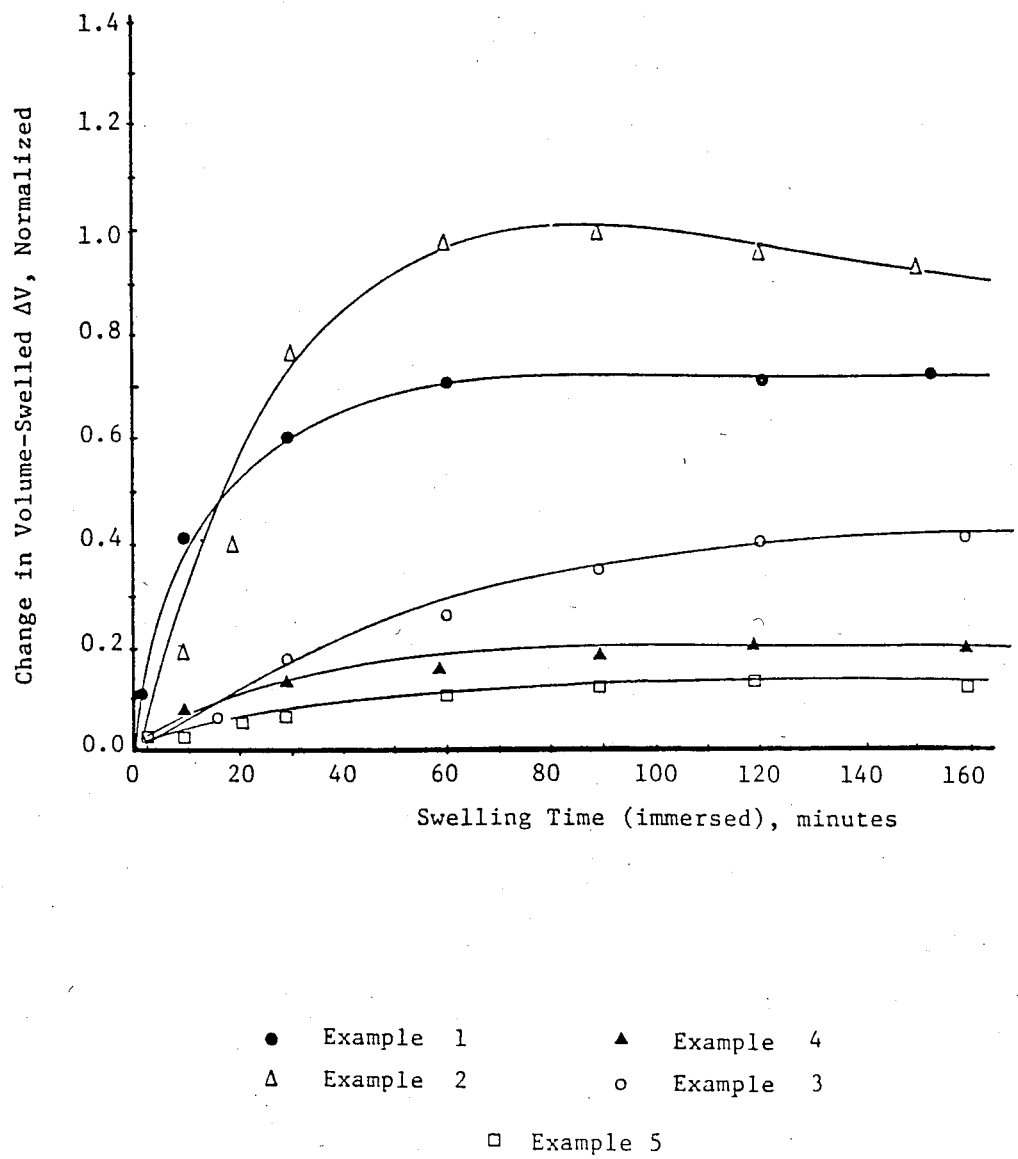
FIG. 3 Swelling of Resin Free Films (No $CrO_2$) in MIBK at 25°C.

POLYESTER-POLYURETHANE COMPOSITION AND USE THEREOF

TECHNICAL FIELD

The present invention is concerned with polyester-polyurethane compositions and use thereof. The polyester-polyurethanes employed in the present invention are used as the binder for $CrO_2$ and especially for producing flexible magnetic recording media. The present invention is particularly useful for magnetic recording media containing ferromagnetic chromium dioxide pigment.

BACKGROUND ART

Flexible magnetic recording media generally comprises magnetic pigment or particles, polymeric binder, lubricant, dispersant, and other minor additives. The majority of magnetic particles of practical importance are metal oxides. Interactions which exist between the magnetic particles and the binder can effect the frictional characteristics of the media, such as tape.

Particle-binder interactions that are desirable from the standpoint of tape-media performance are those interactions which maintain separation of the individual particles, reinforce the mechanical properties of the binder, and hold the particles to the tape's flexible substrate in a cohesive coating. Undesirable interactions between the binder and the magnetic particles can lead to deterioration of magnetic performance or to deterioration of the coating's mechanical properties.

Interaction between the binder and the particles is aggravated significantly by the fact that the majority of magnetic coatings contain magnetic-oxide particles in excess of 70% of the coating by weight and as much as 50% by volume. In order to achieve these high particle loadings, strong interactions between the particle and the polymeric binder are necessary.

Polyester-polyurethanes (a type of thermoplastic elastomer) are widely used as binders for flexible magnetic recording media. These binders are rubbery materials which can be melted and cooled reversibly, without major changes occurring in their chemical or physical properties. Their unique properties, which are a direct result of the block-copolymer nature of these materials, make them significantly different from other elastomers, such as natural or synthetic rubber.

These materials are composed of segments or blocks of chemically different units. The polyester portion, or soft segment, is composed of a repeating series of ester-linked units, and is itself a short-chain-length polymer. The polyester segments are formed by the reaction of a difunctional carboxylic acid with a difunctional alcohol, such that the ester is terminated substantially with alcohol or hydroxyl end groups. This polyester portion typically has a molecular weight of from 500 to 4000, corresponding to chains composed of from 4 or 5 ester units to as many as 20. The effect of an increase in the length of the soft segment is generally an increase in the elasticity of the polyurethane. In general, it is the soft-segment portion of the polyester-polyurethane that determines the low temperature and the elastomeric properties of the binder.

The other component in the polyester-polyurethane is the polyurethane or hard segment portion. This portion possesses a markedly different chemical and mechanical behavior from that exhibited by the polyester soft segments. In general, the hard segment is a hard, rigid polymer with a melting point near 200° C. The hard segment is usually produced from a difunctional, aromatic diisocyanate, such as 4,4'-diphenylmethane diisocyanate (MDI) which is reacted with a difunctional alcohol such as 1,4-butanediol. The hard segment usually has a very short chain length in the case of polyester-polyurethane elastomers used in solvent-based magnetic media coatings because the hard segment is not particularly soluble in the common solvents (examples are THF and MIBK) used in the manufacture of magnetic tape coatings. In addition, the size of the hard segment blocks has been found to increase hardness, modulus, and flow temperature at the expense of elasticity and toughness. For flexible magnetic recording tape, a balance of properties is sought so that the binder can be adapted to the requirements of magnetic recording.

It has been found, in accordance with the suggestions in U.S. Pat. No. 4,284,750, that thermoplastic polyurethane compositions having excellent mechanical and thermal properties, high hardness, and the capacity of binding or adhering to magnetic pigments can be formed by reacting (A) cyclohexanedimethanol and an acid selected from the group adipic acid, azelaic acid, and 1,12-dodecanedioic acid, including mixtures thereof; (B) a chain extender such as 1,4-butanediol; and (C) a diisocyanate such as MDI (methylene bis diphenyl diisocyanate, also known as 4,4'-diphenylmethane diisocyanate).

It has been found, however, that when magnetic chromium dioxide is employed as the ferromagnetic pigment, in place of iron oxide particles with binders disclosed in U.S. Pat. No. 4,284,750, certain problems are encountered. For instance, if one follows the teachings of U.S. Pat. No. 4,284,750 when making chromium dioxide magnetic recording media, a substantial decay in the media's mechanical properties, such as the modulus (i.e., hardness, stiffness, load bearing capacity), occurs within the temperature range of 10° C. to 50° C. If one tries to improve the media by thermal annealing, only slight improvement results.

In U.S. Ser. No. 567,291, certain problems concerning coating performance are overcome. In particular, it has been found, according to said application, that polyester-polyurethanes, of the general type defined in U.S. Pat. No. 4,284,750, become satisfactory for use with chromium dioxide particles when the polyurethane possesses increased hard segment content in the range 37% to 40% by weight and, preferably, 40% with the soft segment molecular weight being in the range of about 500 to 1500.

However, it has been found that such binders are not entirely satisfactory from a processability standpoint. In particular, such binders tend to be brittle. Also, such binders have a tendency to lose cohesive integrity and adhesion to substrates such as polyethylene terephathalate substrates.

Further, concerning various contributions recognized by the prior art to the structural and mechanical properties of polyurethanes made by the hard segment content, attention is directed to the following publications.

R. J. Zdrahala, et al., "J. Elast. Plast.", Vol. 12, p. 184, 1980.

S. L. Cooper and A. V. Tobolsky, "J. Appl. Poly. Sci.", Vol. 10, p. 1837, 1966.

K. C. Frischland and S. L. Reegen, Ed., "Advances in Urethane Sci. Tech.", Vol. 3, pp. 36–65, 1974.

T. E. Lipatova, et al., "Poly. Sci. U.S.S.R.", Vol. 20, p. 2305, 1979.

W. Nierzwicki and E. Szpilewicz, "J. Appl. Poly. Sci.", Vol. 23, p. 2147, 1979.

R. J. Zdrahala, et al., "J. Elast. Plast.", Vol. 12, p. 225, 1980.

C. S. Schollenberger, "Advances in Chemistry Series 176", American Chemical Society, 1979.

SUMMARY OF THE INVENTION

The present invention makes it possible to overcome the above discussed problems with respect to brittleness, loss of cohesive integrity, and loss of adhesion without a concomitant loss of other desirable properties. In particular, the present invention is concerned with compositions comprising $CrO_2$ in combination with certain polyester-polyurethanes.

The polyester-polyurethanes are reaction products of a hydroxy-terminated polyester, a diol chain extender, and a diisocyanate. In accordance with the present invention, the chain extender must be a mixture of 1,4-butanediol and 1,6-hexanediol in a weight ratio of about 35:65 to about 65:35 of 1,4-butanediol to 1,6-hexanediol in order to obtain the advantages of the present invention. In addition, the hydroxyl-terminated polyester is a reaction product of a difunctional alcohol having hydrolytic stability and a dicarboxylic acid.

The polyester has a hydroxyl number of about 150–260. The resultant hydroxyl number of the polyester and chain extender is about 150–350.

The relative proportions of the hydroxyl-terminated polyester, diol chain extender, and diisocyanate are selected to produce a thermoplastic polyester-polyurethane having a hard segment in the range of about 32% to about 60% by weight and a soft segment molecular weight (Mn) of about 415 to about 2250.

The present invention is also concerned with a magnetic recording media comprising a substrate coated with a composition comprising a ferromagnetic $CrO_2$ pigment and a polyester-polyurethane, as defined hereinabove.

BRIEF DESCRIPTION OF THE DRAWINGS

FIG. 1 is a graph showing coefficient of sliding friction versus Temperature for pigmented compositions within the scope of the present invention.

FIG. 2 is a graph showing Tensile Storage Modulus versus Temperature for a pigmented composition within the scope of the present invention.

FIG. 3 is a graph showing swelling behavior of various polyester-polyurethanes.

BEST AND VARIOUS MODES FOR CARRYING OUT THE INVENTION

The polyester-polyurethane employed in accordance with the present invention, must be a reaction product of:

a. a hydroxyl-terminated polyester which is a reaction of a difunctional alcohol having hydrolytic stability and a dicarboxylic acid or ester thereof or mixture of acid and ester wherein the polyester has a hydroxyl number of about 50–260;

b. a chain extender containing a mixture of 1,4-butanediol and 1,6-hexanediol in a weight ratio of about 35:65 to about 65:35 of the 1,4-butanediol to the 1,6-hexanediol;

c. the resultant hydroxyl number of said polyester and chain extender being about 150–350;

d. a diisocyanate wherein the relative proportions of a, b, and d are selected to produce a polyester-polyurethane having a hard segment content in the range of about 32% to 60% by weight and a soft segment molecular weight (Mn) in the range of about 415–2250.

The difunctional alcohol used to prepare the hydroxyl-terminated polyester must be hydrolytically stable and is preferably 1,4-cyclohexanedimethanol. However, other diols can be used, if desired. Examples of other diols are hydroquinone di ($\beta$-hydroxyethyl) ether; and 2,2-dimethyl 1,3-propanediol.

The dicarboxylic acid or ester employed to prepare the hydroxyl-terminated polyester is generally a saturated aliphatic carboxylic acid, preferably a straight chain saturated aliphatic carboxylic acid having 6–12 carbon atoms, and most preferably, is adipic acid, azelaic acid, or 1,2-dodecanedioic acid or ester thereof. Esters that can be used in preparing the polyester are generally alkyl esters such as the methyl esters including dimethyl 1,4-butanedicarboxylate; dimethyl 1,7-heptanedicarboxylate; and dimethyl 1,10-decanedicarboxylate.

Mixtures of dicarboxylic acids and/or esters can be employed when desired.

The alcohol and acid are reacted in amounts and under conditions such that the hydroxyl-terminated polyester has a hydroxyl number of about 50–260 and preferably about 150–180. The preparation of the hydroxyl-terminated polyester may be carried out in the presence of an esterification catalyst or combination of catalysts. Some catalysts in general use are derivatives of tin, such as, for example, stannous oxalate, stannous octoate, dibutyl tin oxide, dibutyl tin dilaurate, stannous chloride, and stannous fluoride. Combinations of tin catalysts and others may be employed as desired.

The esterification reaction is carried out in an inert atmosphere, i.e., in a nitrogen atmosphere which aids in the prevention of degradation and excessive color in the polyester.

The chain extender, in accordance with the present invention, is a mixture of 1,4-butanediol and 1,6-hexanediol. The weight ratio of the 1,4-butanediol to the 1,6-hexanediol is about 35:65 to about 65:35, preferably about 40:60 to about 60:40, and most preferably, about 50:50. The chain extender can also, but not preferably, include minor amounts (up to about 10% by weight of the total chain extender) of other chain extenders such as ethylene glycol, propylene glycol, 1,3-butanediol, 1,5-pentanediol, 1,4-cyclohexanedimethanol, and hydroquinone di($\beta$-hydroxyethyl) ether.

The quantity of chain extender used is controlled by the hydroxyl number of the polyester which is in the range of from 50–260 and the hydroxyl number of the polyester chain extender blend which is in the range of 150–350.

According to the present invention, the diisocyanate can be an aliphatic or aromatic diisocyanate and preferably is an aromatic diisocyanate.

The quantity of diisocyanate employed is related to the equivalent weight of the hydroxy terminated polyester and chain extender blend. The relationship between the hydroxyl number and equivalent weight is given by the following expression:

$$\text{Equivalent Weight} = \frac{56.1 \times 100}{\text{Hydroxyl Number}}$$

The ratio of the number of equivalents of the hydroxy terminated polyester and chain extender blend to the number of equivalents of diisocyanate is between 1-1.7, preferably in the range of from 1-1.05.

The preferred diisocyanate is methylene bis diphenyl diisocyanate, also known as diphenyl methane-p,p'-diisocyanate, hereinafter referred to as MDI. Other operable diisocyanates may be the aliphatic diisocyanates such as tetramethylene diisocyanate, hexamethylene diisocyanate, and the like; the cycloaliphatic diisocyanates such as cyclohexyl diisocyanate, and the like; the aromatic diisocyanates such as the phenyl diisocyanates, the toluene diisocyanates, and the like; the dicycloaliphatic diisocyanates such as cyclohexyl methane diisocyanate, and the like; and the diaryl diisocyanates such as MDI, dichloro-diphenyl methane diisocyanate, dimethyl diphenyl methane diisocyanate, diphenyl dimethyl methane diisocyanate, dibensyl diisocyanate, diphenyl ether diisocyanate, and the like.

The relative proportions of the hydroxyl-terminated polyester, chain extender, and diisocyanate must be such to yield a thermoplastic polyester-polyurethane having a hard segment content of about 32% to about 60% by weight and a soft segment molecular weight (Mn) of about 415-2250 and preferably about 600-900.

Further, it is preferred that the molecular weight (Mw) of the polyurethane to be above 60,000.

The polyurethanes employed in accordance with the present invention provide for a combination of high yield strength and high hardness along with high Young's Modulus. In addition, the composition of the present invention retains its desirable properties at elevated temperatures. For instance, the polyurethanes employed in the present invention generally exhibit hardness values significantly in excess of 100 Shore A Hardness and usually at least about 60 Shore D Hardness, at times up to about 90 Shore D Hardness, and preferably about 70 to about 75 Shore D Hardness. In addition, the polyurethanes employed pursuant to the present invention exhibit high yield strengths such as about 40 to about 70 MPa, along with high Young's Modulus such as about 1 to about 3 GPa as measured at room temperature. The polyurethane employed in the present invention also usually possess breaking elongation of about 200% to about 280% and more usually about 210% to about 216%.

In accordance with the present invention, non-brittle compositions containing a high content of pigment can be obtained. The pigment is predominantly (e.g. at least 50% by weight of total pigment) ferromagnetic chromium dioxide. Other pigments can be admixed with the chromium dioxide. Examples of other pigments include ferromagnetic pigments such as magnetic iron oxide, magnetic cobalt-modified ion oxide, metallic iron, and magnetic ferrites.

The most pronounced improvements achieved by the present invention are obtained when the pigment is entirely chromium dioxide.

The chromium dioxide particles, per se, may be either stabilized or unstabilized from the effects of reductive degradation, as caused, for example, by the presence of water and certain easily oxidizable functional groups such as hydroxyl or amine. Stabilized particles are, however, preferred.

The pigment is preferably employed in amounts of about 65% by weight to about 88% by weight, or up to the critical pigment volume, and most preferably about 78% to about 82% by weight.

In addition, the compositions can include auxiliary constituents such as diluents, lubricants, and dispersants, when desired.

An example of a suitable lubricant is tridecyl stearate which, when employed, is usually present in amounts of about 5 to 10% by weight of the composition.

In addition, the composition can contain an organic polyisocyanate which, when present, is generally in amounts up to about 15% by weight, and preferably about 5% to about 10% by weight based upon the polyurethane.

An example of a suitable polyisocyanate is poly (methylene bis diphenyl diisocyanate), also known as poly (methylene polyphenyl isocyanate), hereinafter referred to as pMDI.

Such is present in Mondur MRS which is commercially available.

Other operable polyisocyanates may be either aliphatic polyisocyanates such as poly (isophorone isocyanate) or aromatic polyisocyanate such as poly (phenyl isocyanate), poly (toluene isocyanate), and the like.

The amount of the polyisocyanate when used as discussed above is such that the resulting cured coating is essentially free of NCO (isocyanate) groups in the final form as used in preparing magnetic media.

The compositions of the present invention are preferably used to prepare magnetic recording media and most preferably flexible magnetic recording media such as magnetic tape.

For instance, coating compositions can be prepared by preparing a slurry of the magnetic particle, a dispersant, and a solvent; then preparing a binder solution of the polyester-polyurethane, a lubricant, and a solvent; and adding the binder solution to the slurry to form the coating. The coating can then be coated onto a flexible substrate, e.g., polyethylene terephthalate, to form magnetic recording tape.

The apparent glass transition temperature ($T_g$) of coatings of the present invention are preferably above normal room temperatures and most preferably about 40° C. to 50° C. This contributes to the retention of the physical properties of the compositions at elevated temperatures.

The following non-limiting examples are presented to further illustrate the present invention:

EXAMPLE 1

Part A—Preparation of Hydroxyl Terminated Polyester

Into a reaction vessel equipped with a sealed stirrer, nitrogen inlet and two connected reflux condensers, about 10.32 moles of molten (80° C.-90°C.) 1,4 cyclohexanedimethanol are added under constant stirring. To the stirred mass about 5.6 moles of adipic acid and about 2.4 moles of azelaic acid are added together with a catalyst combination of about 1.0 grams of stannous oxalate and about 4.0 grams of phthalimide. Purging with nitrogen was begun. Steam is fed to the first condenser and cold water to the second one while raising the temperature of the mixture to about 225° C. while continuously removing water. The reaction is allowed to proceed at this temperature for about four (4) hours, after which time the batch is allowed to cool to about 165° C. and the nitrogen supply is discontinued. A vacuum of less than about 5.0 mm mercury is drawn and the reaction is allowed to continue for about five (5) hours at about 165° C. while removing the remaining water and low molecular weight polyester. At the end of this time, the batch is cooled to about 100° C. The resultant hydroxyl terminated polyester has an acid number of about 0.5 and a hydroxyl number of about 100.

Part B—Preparation of Polyurethane Resin

The polyester of Procedure A is blended with the chain extender which is a blend of 1,4-Butanediol/1,6-Hexanediol 1:1 by weight. Thus, into about 1343.68 grams of polyester about 256.32 grams of chain extender are added to yield a polyester chain extender blend having a hydroxyl number of 260. To this entire polyol blend there are added about 1.0 grams of triethylenediamine and about 917.4 grams of MDI. The ingredients are thoroughly mixed and then cured in an oven at about 125° C. for about one (1) hour. The resulting polyurethane polymer has a viscosity of about 1780 cps when measured as a 20% solution in tetrahydrofuran.

% Hard Segment =

$$\frac{(\text{Weight of MDI} + \text{Weight of Chain Extender})}{(\text{Weight of Polymer})} \times 100 = \frac{(917.4 + 256.32)}{2517.4} \times 100 = 46.92$$

EXAMPLE 2

The polyester prepared in accordance with Part A of Example 1 is blended with the chain extender which is a blend of 1,4-Butanediol/1,6-Hexanediol 1:1.

Thus, into about 1298.24 grams of polyester about 301.76 grams of the chain extender are added to yield about 1600.0 grams of a polyester-chain extender blend having a hydroxyl number of about 290. To this entire polyol blend there are added about 1.0 grams of triethylenediamine catalyst and about 1025.8 grams of MDI to give a resulting polyurethane polymer having a viscosity of about 1500 cps when measured as a 20% solution in tetrahydrofuran and a % hard segment content of about 50.55 by weight.

EXAMPLE 3

Part A

Part A of Example 1 is repeated, except that the quantity of 1,4-cyclohexanedimethanol used is about 11.52 moles to yield a polyester having an acid number of about 0.3 and a hydroxyl number of about 140.

Part B

The polyester prepared in accordance with Part A of this Example is blended with the chain extender (1:1 by weight 1,4-Butanediol/1,6-Hexanediol). Thus, into about 1374.72 grams of polyester about 225.28 grams of chain extender are added to yield a polyol blend having a hydroxyl number of about 275. To this entire polyol blend there are added about 1.0 grams of triethylenediamine and about 970.0 grams of MDI to give a resulting polyurethane polymer having a viscosity of about 3350 cps when measured as a 20% solution in tetrahydrofuran and a hard segment content of about 46.5% by weight.

EXAMPLE 4

The polyester prepared in accordance with Part A of Example 3 is blended with the chain extender (1:1 by weight blend of 1,4-Butanediol/1,6-Hexanediol.

Thus, about 1416.48 grams of polyester and about 183.52 grams of chain extender are added to yield a polyol having a hydroxyl number of about 250. To this entire polyol blend there are added 1.5 grams of triethylenediamine and about 885.8 grams of MDI to give a resulting polyurethane polymer having a viscosity of about 1900 cps when measured as a 20% solution in tetrahydrofuran and a hard segment content of about 43% by weight.

EXAMPLE 5

The polyester prepared in accordance with Part A of Example 3 is blended with the chain extender (1:1 by weight of 1,4-Butanediol/1,6-Hexanediol). Thus, into about 1332.96 grams of polyester (hydroxyl number about 140), about 267.04 grams of the chain extender blend are added to yield a polyol having a hydroxyl number of about 300. To this entire polyol blend there are added about 1.5 grams of triethylenediamine and about 1069.5 grams of MDI to give a resulting polyurethane polymer having a viscosity of about 3000 cps when measured as a 20% solution in tetrahydrofuran and a hard segment content of about 50.0% by weight.

EXAMPLE 6

A slurry of magnetic chromium dioxide is prepared by mixing about 275.0 pounds of chromium dioxide, about 8.3 pounds soybean lecithin, about 254.1 pounds of tetrahydrofuran, and about 84.7 pounds of methylisobutyl ketone in a high-speed premix tank. This premix is then passed through a series of high-speed sandmills, or equivalent dispersion equipment, to produce a milled slurry of about 45-46% solids by weight.

A binder solution containing about 13.4% by weight of solids is prepared by mixing about 46.0 pounds of the polyester-polyurethane obtained in accordance with the procedure of Example 1, about 5.4 pounds of a fatty acid lubricant (trydecyl stearate), about 248.5 pounds of tetrahydrofuran, and about 82.8 pounds of methylisobutyl ketone.

This binder solution is then combined with an equal volume of the milled chromium dioxide slurry in a high-speed sandmill to give a final ink of about 32.7% solids and about 83.3% pigment by weight. Prior to coating of the ink, about 3.1 pounds of a functional isocyanate hardener Mondur MRS (NCO content ~2.2–2.4) is mixed into the ink. The ink is then filtered prior to coating.

The final ink is then applied to a moving web of flexible substrate of polyethylene terephthalate by means of hydrodynamic extrusion as described in U.S. Pat. No. 4,345,543 (disclosure of which is incorporated herein by reference). The coating thus applied is dried and calendered to obtain a coating of 140$\mu$ inches thickness and smooth surface (0.7$\mu$ inch RMS roughness) is obtained. It is processed into half-inch tape suitable for high-density digital recording.

Adhesion and abrasion resistance are excellent. Magnetic performance is good, giving high signal amplitude and data reliability. The apparent glass transition temperature ($T_g$) is about 23° C.

EXAMPLE 7

Example 6 is repeated, except that the polyester-polyurethane in accordance with the procedure of Example 2 is employed as the binder to provide a final ink containing about 33.2% solids.

The ink thus prepared is coated onto a polyester substrate to give a coating of 181μ inches thickness and an average surface roughness of 0.6μ inches RMS. Adhesion is somewhat lower than obtained with Example 6, but the abrasion is slightly improved. Magnetic performance is good, giving high reliability and signal amplitude. The $T_g$ is about 28° C.

EXAMPLE 8

Example 6 is repeated, except that the polyester-polyurethane in accordance with Example 3 is employed as the binder to provide a final ink containing about 33.9% solids.

The ink thus prepared is coated onto a polyester substrate to give a coating of 150μ inches thickness and 0.6μ inches RMS surface roughness. The adhesion of the coating is somewhat better than that achieved with the coating prepared in Example 7. Abrasion resistance appears to be improved as well. Magnetic performance is excellent, giving very high amplitude and data reliability. The media is also found to exhibit good frictional behavior (FIG. 1). The mechanical performance of the coating as measured as a free film with a dynamic mechanical analyzer (FIG. 2) is also found to be good. The apparent $T_g$ of the coating is observed at about 50° C. This contributes to good control of the surface deformation of the coating for maintaining stable frictional performance.

EXAMPLE 9

Example 6 is repeated, except that the slurry of chromium dioxide contains about 46.6% solids and that the polyester-polyurethane prepared in accordance with the procedure of Example 4 is employed as the binder to provide a final ink containing about 33.1% solids.

The ink thus prepared is coated onto a polyester substrate to give a coating of 152μ inches thickness and 0.5μ inches RMS. The coating adhesion is improved significantly as compared to Examples 7 and 8. Abrasion resistance is comparable to that measured for Example 8. Magnetic performance is excellent, giving very high amplitude and data reliability. The media is also found to exhibit somewhat better frictional behavior (FIG. 1) as compared to Examples 6 and 7, but slightly inferior to that achieved with the polyester-polyurethane used in Example 8. The apparent $T_g$ of the coating prepared using this polyester-polyurethane (Example 4) is observed to occur at about 46° C.

EXAMPLE 10

The procedure of Example 6 is repeated, except that the polyester-polyurethane prepared in accordance with the procedure of Example 5 is employed to provide a final ink containing about 32.5% solids.

The ink thus prepared is coated onto a polyester substrate to give a coating of about 156μ inches thick with an average surface roughness of 0.6μ inches RMS. The adhesion of the coating to the substrate is slightly less than that obtained with Example 9, while the abrasion resistance is slightly improved. Magnetic performance is found to be excellent, giving high amplitude and data reliability. The media is found to give the best frictional properties of all the resin iterations (FIG. 1). The improved frictional performance is noted, despite the relatively lower modulus and $T_g$ observed for this coating as compared to Examples 8 and 9 (FIG. 2).

FIG. 3 presents the observed swelling behavior of these resins (without $CrO_2$ pigment) in methyl isobutyl ketone (MIBK), a non-solvent. It is noted that as the hard-segment content is increased, the swelling of the resin in MIBK decreases. Since MIBK is used as a diluent solvent in the preparation of the coated media, the swelling plays an important part in the characteristic composition of the tape surface and thus impacts the abrasion and frictional performance of the tape. This presumably arises from the control of the surface porosity and permeability of the coating which, in part, governs lubricant film integrity and stability.

As a result, a balance between bulk mechanical properties and the control of the surface composition of the tape appears to be a crucial portion of the practice of this invention and methods thus described for making and characterizing superior performance magnetic media using chromium dioxide pigments.

Having thus described our invention, what we claim as new and desire to secure by Letters Patent is:

1. A composition comprising a $CrO_2$ and a thermoplastic polyester-polyurethane being the reaction product of:
   a. a hydroxyl-terminated polyester which is a reaction of difunctional alcohol having hydrolytic stability and a dicarboxylic acid or ester thereof, or mixture thereof, said polyester having a hydroxyl number of about 50–260;
   b. a chain extender containing a mixture of 1,4-butanediol and 1,6-hexanediol in a weight ratio of about 35:65 to about 65:35;
   c. the resultant hydroxyl number of said polyester and chain extender being about 150–350;
   d. a diisocyanate wherein the relative proportions of a, b, and d are selected to produce a polyester-polyurethane having a hard segment content of about 32% to 60% by weight and a soft segment molecular weight (Mn) of about 415–2250.

2. The composition of claim 1 wherein said difunctional alcohol is 1,4-cyclohexanedimethanol.

3. The composition of claim 1 wherein said acid is a mixture of adipic and azelaic acids.

4. The composition of claim 1 wherein said hydroxyl-terminated polyester has a hydroxyl number of about 150 to about 180.

5. The composition of claim 1 wherein the weight ratio of 1,4-butanediol to 1,6-hexanediol is about 40:60 to about 60:40.

6. The composition of claim 1 wherein the weight ratio of 1,4-butanediol to 1,6-hexanediol is about 50:50.

7. The composition of claim 1 wherein said diisocyanate is methylene bis diphenyl diisocyanate.

8. The composition of claim 1 wherein the soft segment molecular weight (Mn) is about 600–900.

9. The composition of claim 1 wherein the molecular weight of the polyurethane is above 60,000.

10. The composition of claim 1 wherein the Shore D Hardness of the polyurethane is at least about 60.

11. The composition of claim 1 wherein the $CrO_2$ is employed in amounts of at least about 65% by weight of the composition.

12. The composition of claim 1 wherein the $CrO_2$ is employed in amounts of about 78% to about 82% by weight.

13. The composition of claim 1 wherein the apparent glass transition temperature is about 40° C. to about 50° C.

14. A magnetic recording media comprising a substrate and a ferromagnetic $CrO_2$-loaded binder adhesively coating said substrate, said binder being a thermoplastic polyester-polyurethane being a reaction product of:

a. a hydroxyl-terminated polyester which is a reaction of a difunctional alcohol having hydrolytic stability and a dicarboxylic acid, or ester thereof, or mixture thereof, said polyester having a hydroxyl number of about 50–260;

b. a chain extender containing a mixture of 1,4-butanediol and 1,6-hexanediol in a weight ratio of about 35:65 to about 65:35;

c. the resultant hydroxyl number of said polyester and chain extender being about 150–350;

d. a diisocyanate wherein the relative proportions of a, b, and d are selected to produce a polyester-polyurethane having a hard segment content of about 32% to 60% by weight and a soft segment molecular weight (Mn) of about 415–2250.

15. The media of claim 14 wherein said substrate is polyethylene terephthalate.

16. The media of claim 14 wherein said difunctional alcohol is 1,4-cyclohexanedimethanol.

17. The media of claim 14 wherein said acid is a mixture of adipic and azelaic acids.

18. The media of claim 14 wherein said hydroxyl-terminated polyester has a hydroxyl number of about 150 to about 180.

19. The media of claim 14 wherein the weight ratio of 1,4-butanediol to 1,6-hexanediol is about 40:60 to about 60:40.

20. The media of claim 14 wherein the weight ratio of 1,4-butanediol to 1,6-hexanediol is about 50:50.

21. The media of claim 14 wherein said diisocyanate is methylene bis diphenyl diisocyanate.

22. The media of claim 14 wherein the soft segment molecular weight (Mn) is about 600–900.

23. The media of claim 14 wherein the molecular weight of the polyurethane is above 60,000.

24. The media of claim 14 wherein the Shore D Hardness of the polyurethane is at least about 60.

25. The media of claim 14 wherein the $CrO_2$ is employed in amounts of at least about 65% by weight of the composition.

26. The media of claim 14 wherein the $CrO_2$ is employed in amounts of about 78% to about 82% by weight.

27. The media of claim 14 wherein the apparent glass transition temperature of the coating is about 40° C. to about 50° C.

* * * * *